US010288890B2

(12) United States Patent
Lammers-Meis et al.

(10) Patent No.: US 10,288,890 B2
(45) Date of Patent: May 14, 2019

(54) ATTACHMENT FOR HEAD MOUNTED DISPLAY

(71) Applicant: Garmin Switzerland GmbH, Schaffhausen (CH)

(72) Inventors: David F. Lammers-Meis, Olathe, KS (US); Sheng-Kai Chang, New Taipei (CN); Ssu-Chieh Yu, New Taipei (CN)

(73) Assignee: Garmin Switzerland GmbH (CH)

( * ) Notice: Subject to any disclaimer, the term of this patent is extended or adjusted under 35 U.S.C. 154(b) by 174 days.

(21) Appl. No.: 15/341,865

(22) Filed: Nov. 2, 2016

(65) Prior Publication Data
US 2017/0184861 A1   Jun. 29, 2017

Related U.S. Application Data

(60) Provisional application No. 62/271,633, filed on Dec. 28, 2015.

(51) Int. Cl.
*G02B 27/01*  (2006.01)
*F16M 13/02*  (2006.01)
*F16M 11/10*  (2006.01)
*F16M 13/04*  (2006.01)
*G02C 11/00*  (2006.01)

(52) U.S. Cl.
CPC ......... *G02B 27/0176* (2013.01); *F16M 11/10* (2013.01); *F16M 13/02* (2013.01); *F16M 13/04* (2013.01); *F16M 2200/022* (2013.01); *G02B 2027/0169* (2013.01); *G02B 2027/0178* (2013.01); *G02C 11/10* (2013.01)

(58) Field of Classification Search
CPC .... G02B 2027/0154; G02B 2027/0159; G02B 2027/0169; G02B 27/0176; G02C 11/00; G02C 11/10
USPC ............... 224/181; 248/222.52; 403/DIG. 12
See application file for complete search history.

(56) References Cited

U.S. PATENT DOCUMENTS

| | | | | | |
|---|---|---|---|---|---|
| 6,120,146 | A | * | 9/2000 | Harris | G02C 11/00 351/121 |
| 6,731,202 | B1 | * | 5/2004 | Klaus | B60Q 1/525 340/425.5 |
| 9,195,076 | B2 | * | 11/2015 | Kavana | G02C 11/00 |
| 2012/0189382 | A1 | * | 7/2012 | Health | B60P 7/0815 403/349 |
| 2014/0062756 | A1 | * | 3/2014 | Lamkin | G08G 5/0021 342/29 |
| 2014/0253868 | A1 | * | 9/2014 | Jannard | G02C 9/04 351/158 |
| 2015/0302654 | A1 | * | 10/2015 | Arbouzov | G06T 19/006 345/633 |

(Continued)

*Primary Examiner* — Scott T McNurlen
(74) *Attorney, Agent, or Firm* — Samuel M. Korte; Max M. Ali

(57) ABSTRACT

A system for removably attaching a portable display to a headpiece is described that includes an attachment device configured to receive the portable display. The attachment device includes a mounting base configured to mount to a longitudinal frame member of the headpiece. The mounting base includes a receptacle for receiving a mounting protrusion of the portable display. The attachment device further includes one or more opposing hooks connected to the mounting base. The hooks are configured to receive opposing ends of an elastic band when the elastic band is connected between the hooks and around the longitudinal frame member.

13 Claims, 17 Drawing Sheets

(56) References Cited

U.S. PATENT DOCUMENTS

2016/0090036 A1* 3/2016 Kiefer ................ B60Q 1/0023
340/435
2016/0371219 A1* 12/2016 Lee .................... G06F 13/4081

* cited by examiner

ATTACHMENT FOR HEAD MOUNTED DISPLAY

CROSS-REFERENCE TO RELATED APPLICATIONS

The present application claims the benefit under 35 U.S.C. § 119(e) of U.S. Provisional Application Ser. No. 62/271,633, filed Dec. 28, 2015, and titled "HEAD MOUNTED DISPLAY (HMD)," which is herein incorporated by reference in its entirety.

BACKGROUND

A head mounted display (or helmet mounted display, e.g., for aviation applications), abbreviated HMD, is a portable display device, worn on the head (or as part of a helmet), that can include a display optic in front of one (monocular HMD) or each eye (binocular HMD). Optical head mounted displays are wearable displays that can reflect projected images, allowing a user to see through the image.

SUMMARY

A system for removably attaching a portable display to a headpiece is described that includes an attachment device configured to receive the portable display such as a head mounted display (HMD). The attachment device includes a mounting base configured to mount to a longitudinal frame member of the headpiece. The mounting base includes a receptacle for receiving a mounting protrusion of the portable display. The attachment device further includes one or more opposing hooks connected to the mounting base. The hooks are configured to receive opposing ends of an elastic band when the elastic band is connected between the hooks and around the longitudinal frame member.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

DETAILED DESCRIPTION

Overview

Portable displays such as head mounted displays (or helmet mounted displays) are used to display an image received from a source to a single user for viewing. Head mounted displays are worn on or proximate to the head of the user and display one or more image sources over the user's eyes. These displays can be used to display information to a user during an activity so that the user is not required to repeatedly interact with a smart phone, computer display, or other electronic device during the activity.

Head mounted displays are becoming increasingly popular in many applications such as aviation, military tactics, engineering, medicine and research, gaming, sports, and simulation training. While head mounted displays have become increasingly popular, existing systems have several limitations. For example, many head mounted displays are permanently integrated with glasses, sunglasses, or goggles. The permanent integration of these systems reduces their flexibility, as it necessitates that a user purchase an expensive system that can only be utilized with one type of eyewear. Further, the permanent integration of these systems often deters their use as a user may dislike the styling or fit of the permanently integrated glasses.

Accordingly, a system for removably attaching a portable display such as a head mounted display or the like to a headpiece is described. The system includes an attachment device configured to receive the portable display. The attachment device includes a mounting base configured to mount to a longitudinal frame member of the headpiece. The mounting base includes a receptacle for receiving a mounting protrusion of the portable display. The attachment device further includes one or more opposing hooks connected to the mounting base. The hooks are configured to receive opposing ends of an elastic band when the elastic band is connected between the hooks and around the longitudinal frame member.

Example Environment

Figure 1:
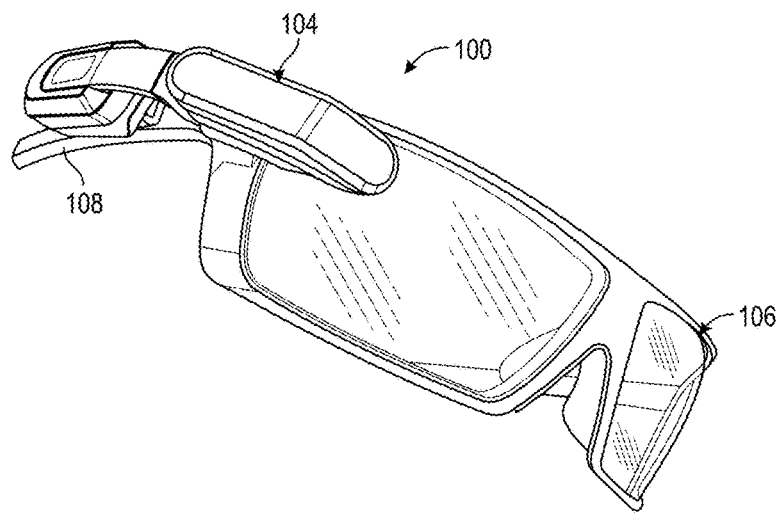
FIG. 1 is a perspective view illustrating a head mounted display attached to an arm of eyewear using an attachment device in accordance with an embodiment of the present disclosure.

FIG. 1 illustrates a system 100 in accordance with an embodiment of the present disclosure. As shown, the system 100 includes an attachment device 102 configured for attaching a portable display such as a head mounted display, helmet mounted display, or another portable display (a head mounted display 104 is shown) to a headpiece such as, for example, eyewear (e.g., prescription glasses, reading glasses, sunglasses, etc.), goggles, and so forth 106.

Figure 2:
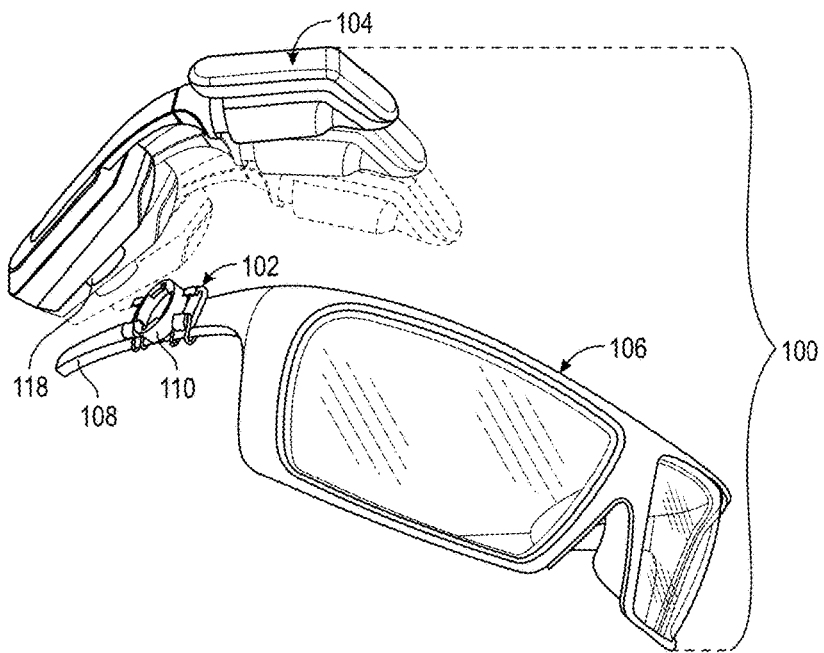
FIG. 2 is an exploded perspective view of the head mounted display, the eyewear, and the attachment device illustrated in FIG. 1.
Figure 3:
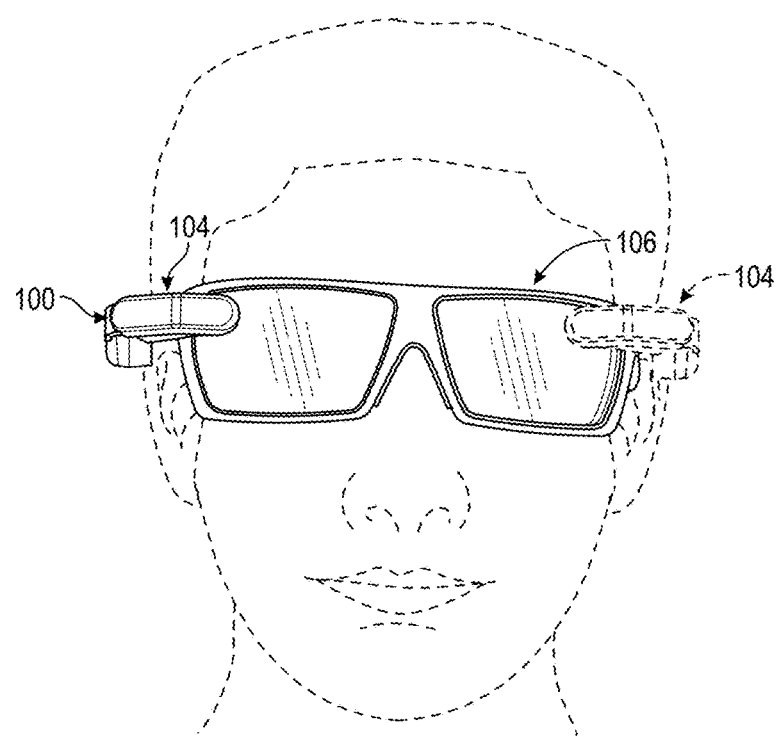
FIG. 3 is a front view of the head mounted display, the eyewear, and the attachment device illustrated in FIG. 1.

When configured for use with eyewear such as glasses or sunglasses 106, the head mounted display 104 can be attached to a longitudinal frame member such as an arm (temple) 108 of the eyewear 106. As shown in FIG. 2, the attachment device 102 is configured to couple the head mounted display 104 with the arm 108 of the eyewear 106 so that the head mounted display 104 is properly positioned for viewing. The attachment device 102 includes a mounting base 110 that is attached to the arm 108 of the eyewear 106. The mounting base 110 removably receives and couples the head mounted display 104 to the arm 108. For example, the head mounted display 104 can include a protrusion such as a mounting post 118 configured to mate with a corresponding receptacle 112 in the mounting base 110. This arrangement allows a user to remove the head mounted display 104 when it's is no longer desired. Moreover, in embodiments, the mounting base 110 can be mounted to either a left or right arm 108 of the eyewear 106. In this manner, the attachment device 102 and the head mounted display 104 can be attached to either side (arm 108) of the eyewear 106 based on the user's preferences, as shown in FIG. 3.

Figure 4:
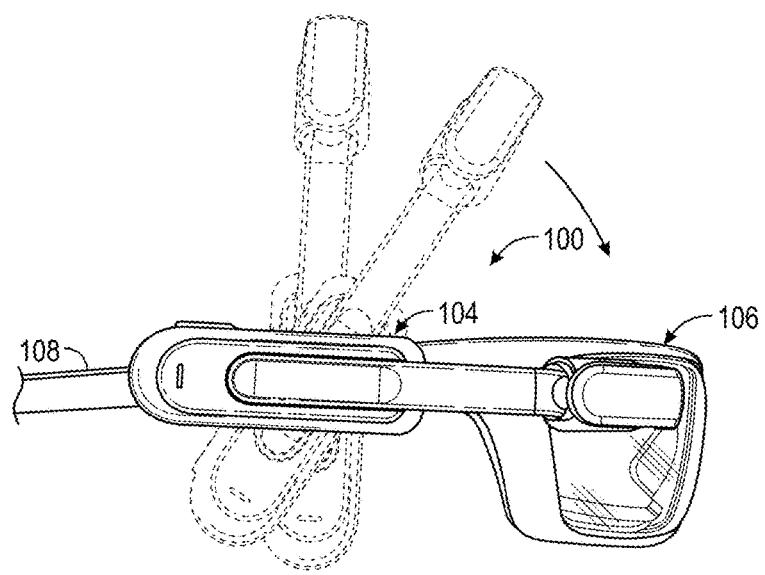
FIG. 4 is a side elevation view of the head mounted display, the eyewear, and the attachment device illustrated in FIG. 1.
Figure 5:
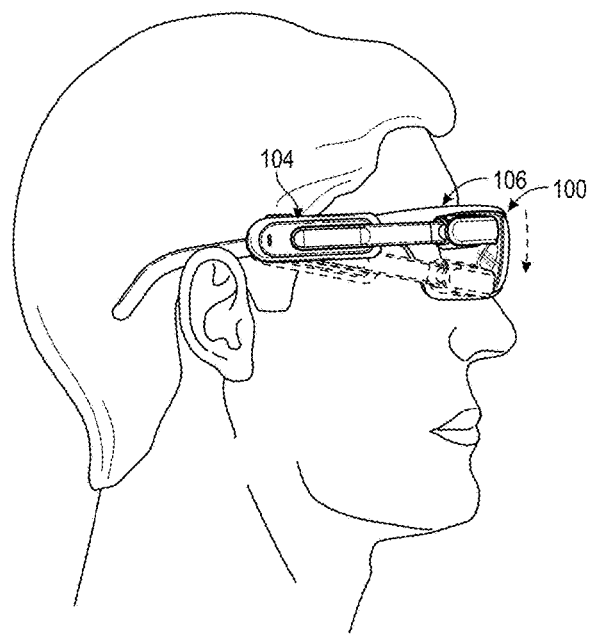
FIG. 5 is another side elevation view of the head mounted display, the eyewear, and the attachment device illustrated in FIG. 1.

As illustrated in FIGS. 4 and 5, the head mounted display 104 can be coupled to the mounting base 110 such that the position of the head mounted display 104 relative to the arm 108 is adjustable. For example, the head mounted display 104 can be moveably connected to the mounting base 110 so that the head mounted display 104 can be rotated relative to the arm 108. The user can adjust (e.g., pivot) the head mounted display 104 so that the head mounted display 104 is positioned proximate to the lens of the eyewear in a first orientation (e.g., when the head mounted display 104 is in use) and away from the lens in a second orientation (e.g., when the head mounted display 104 is not in use), as illustrated in FIG. 4. The user can also adjust (e.g., pivot) the head mounted display 104 to change the position of the head mounted display 104 over the lens, as illustrated in FIG. 5. However, moveably connecting the head mounted display 104 to the mounting base 110 is offered by way of example only and is not meant to be restrictive of the present disclosure. Thus, in other embodiments, the position of the head mounted display 104 can be fixed relative to the arm 108.

Figure 6:
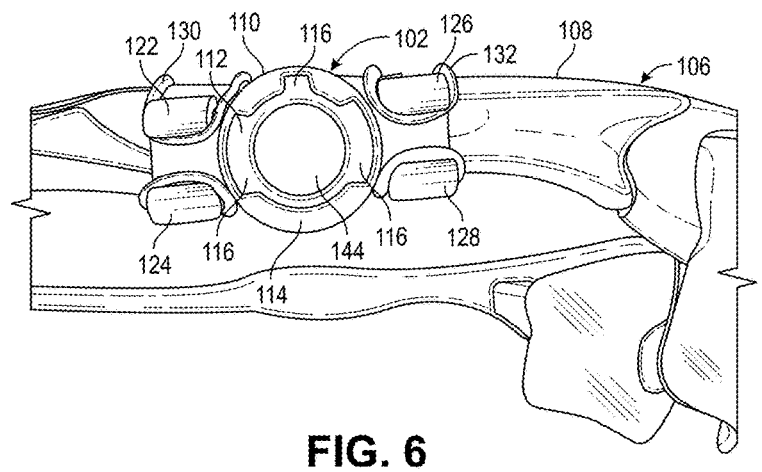
FIG. 6 is a side elevation view of the eyewear and the attachment device illustrated in FIG. 1.
Figure 7:
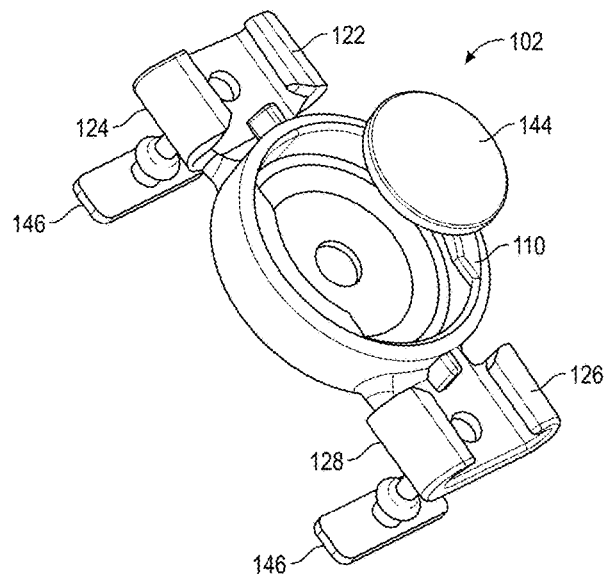
FIG. 7 is a perspective view illustrating an attachment device, such as the attachment device illustrated in FIG. 1, for attaching a head mounted display to an arm of eyewear in accordance with an embodiment of the present disclosure.

FIGS. 6 and 7 further illustrate the attachment device 102 and the mounting base 110. As shown, the mounting base 110 includes a receptacle 112 configured to receive the mounting post 118. In some embodiments, the receptacle 112 comprises a quarter-turn mount receptacle and the mounting post 118 comprises a corresponding protrusion configured to be received into the quarter-turn mount receptacle and rotated to engage the receptacle 112 to secure the head mounted display 104 to the mounting base 110. For example, in the illustrated embodiment, the receptacle 112 includes one or more notches 116 and/or flanges (e.g., inward extending flange 114). When the head mounted display 104 is attached to the attachment device 102, the mounting post 118 is first aligned with the notches 116 of the receptacle 112. The head mounted display 104 is then rotated a quarter-turn (e.g., approximately ninety degrees (90°)) causing the mounting post 118 to also rotate and slide within the receptacle 112 thereby engaging the inward extending flange 114 and securing the head mounted display 104 to the attachment device 102.

In some embodiments, the mounting base 110 and/or the mounting post 118 can include a friction pad 144 configured to resist rotational movement of the mounting post 118 by furnishing additional frictional force at the end of the post 118. The friction pad 144 can be formed from an elastic material such as rubber, synthetic rubber, silicone, and so forth. However, the use of a friction pad 144 is offered by way of example only and is not meant to be restrictive of the present disclosure. In other embodiments, other resistive mechanisms such as one or more detents, a ratchet mechanism, a lever mechanism, spring-loaded catch mechanism, or the like can be used to restrict movement of the mounting post 118.

In embodiments of the system 100, the attachment device 102 may further include one or more hooks coupled to the mounting base 110. For example, as illustrated in FIGS. 6 and 7, the attachment device 102 includes a first hook 122 and an opposing second hook 124. The first hook 122 and opposing second hook 124 are configured to receive opposite ends of an elastic band 130 so that the elastic band 130 is connected between the first hook 122 and the opposing second hook 124 and around the arm 108, securing the head mounted display 104 to the arm 108. In some embodiments, the attachment device 102 may further include a third hook 126 and an opposing fourth hook 128 that are configured to receive a second elastic band 132. The second elastic band 132 can be connected between the third hook 126 and the opposing fourth hook 128, and around the arm 108, further securing the head mounted display 104 to the arm 108. In embodiments, the third hook 126 and opposing fourth hook 128 can be located on opposing sides of the receptacle 112 from the first hook 122 and second hook 124. However, these configurations of hooks 122-128 and elastic bands 130, 132 are offered by way of example only and are not meant to be restrictive of the present disclosure. In other embodiments, other combinations of hooks and elastic bands can be utilized (e.g., a fifth hook and a sixth opposing hook, two or more diagonally opposed hooks, etc.). The configuration of hooks and elastic bands can be selected to accommodate the specific shape, style, and/or size of the eyewear and/or the longitudinal frame member. In some embodiments, the hooks 122-128 and/or the mounting base 110 can include one or more cushion supports 146, as illustrated in FIG. 7. The cushion supports 146 are configured for cushioning the attachment device 102 against the arm 108. The cushion supports 146 can be formed from a variety of padding materials such as foam, rubber, synthetic rubber, silicone, and so forth.

Figure 8:
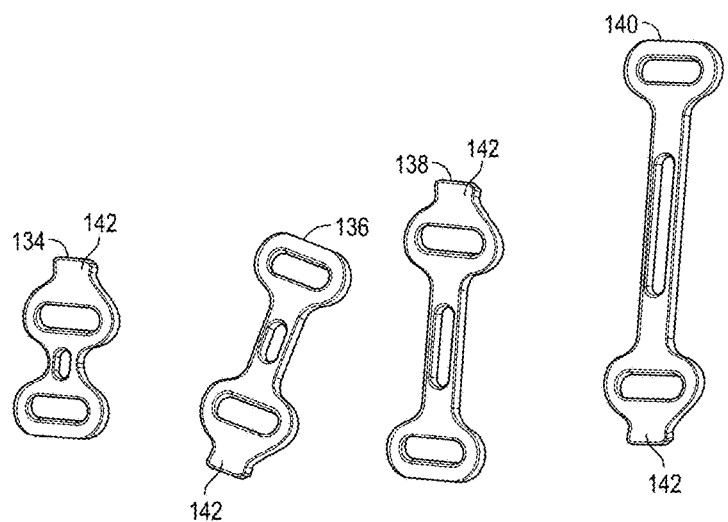
FIG. 8 is a top plan view illustrating a number of elastic bands that can be used to connect an attachment device to an arm of eyewear in accordance with embodiments of the present disclosure.

FIG. 8 further illustrates elastic bands 134-140 that can be used to attach the attachment device 102 to the arm 108. The elastic bands 134-140 can comprise a variety of sizes (e.g., lengths), as shown in FIG. 8. The size of the elastic band 134-140 can be selected to accommodate the specific shape, style, and/or size of the eyewear and/or the longitudinal frame member (arm 108). For example, a shorter elastic band 134 can be utilized with eyewear including thin arms 108, whereas a longer elastic band 140 can be utilized with eyewear including thick arms 108. In some embodiments, the system 100 can include a kit of elastic bands 134-140. The user can then select the elastic band 134-140 that best fits the eyewear with which the head mounted display 104 is to be used. The kit of elastic bands 134-140 enables one attachment device 102 to be utilized with a variety of shapes, styles, and/or sizes of eyewear. Each elastic band 134-140 can include one or more slots to engage with the hooks 122-128. In embodiments, each elastic band 134-140 includes two opposing slots to engage opposing hooks. In some embodiments, the elastic bands 134-140 can include one or more tabs 142 configured for gripping the elastic band 134-140. The tabs 142 can assist the user in attaching or removing the elastic band 134-140 from the longitudinal frame member.

Figure 9:
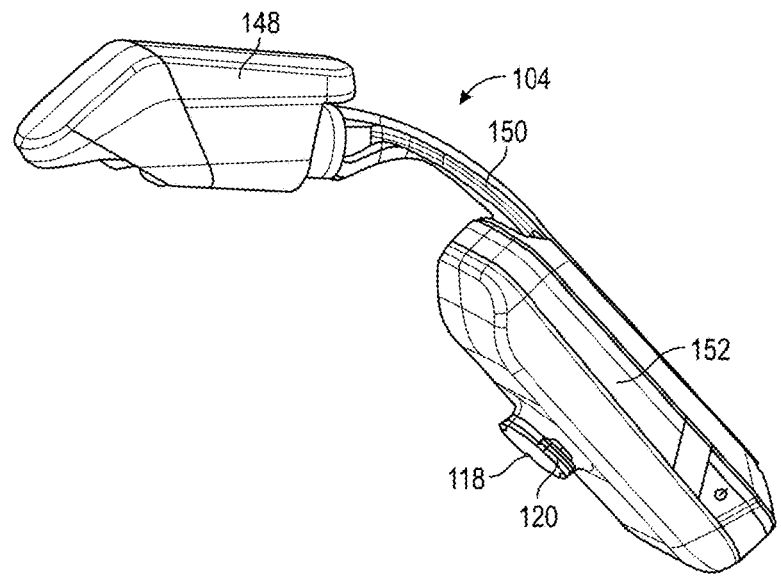
FIG. 9 is a perspective view illustrating a head mounted display for attaching to an arm of eyewear using an attachment device, such as the attachment device illustrated in FIG. 1, in accordance with an embodiment of the present disclosure.
Figure 10:
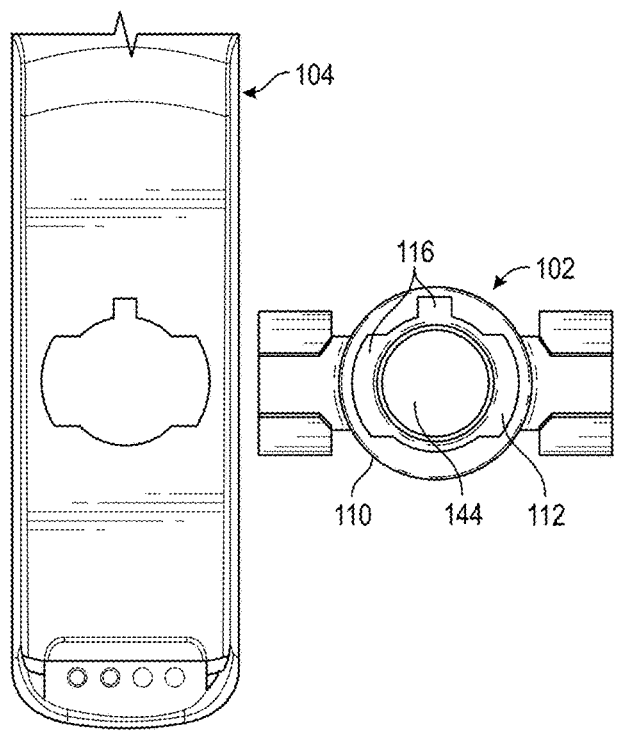
FIG. 10 is a partial side view illustrating an attachment device, such as the attachment device illustrated in FIG. 7, and a head mounted display, such as the head mounted display illustrated in FIG. 9, in accordance with embodiments of the present disclosure.
Figure 11:
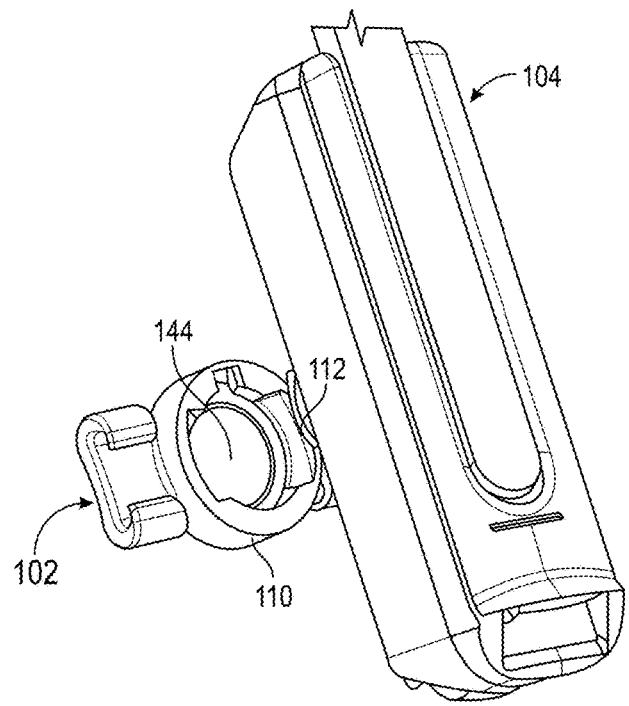
FIG. 11 is a partial perspective view of the attachment device and the head mounted display illustrated in FIG. 10.
Figure 12:
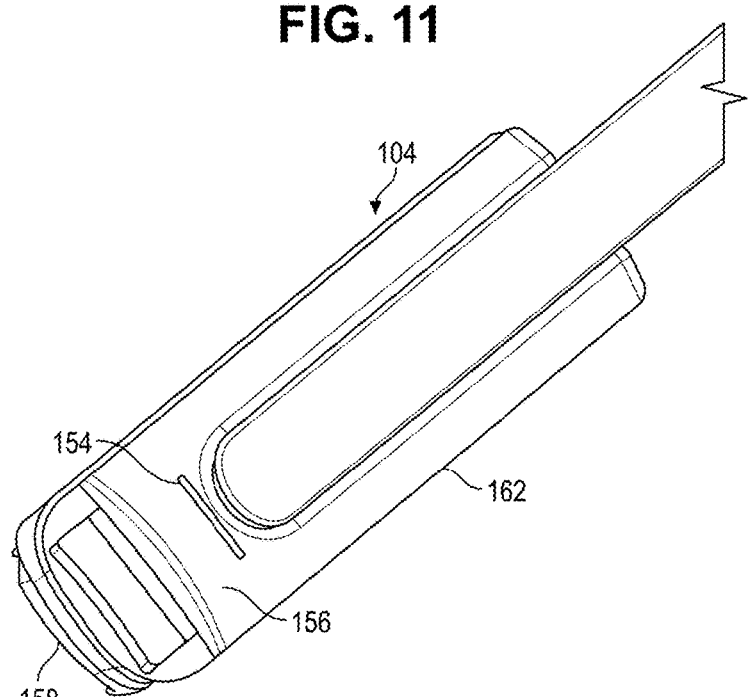
FIG. 12 is a partial side view of the head mounted display illustrated in FIG. 9.
Figure 13:
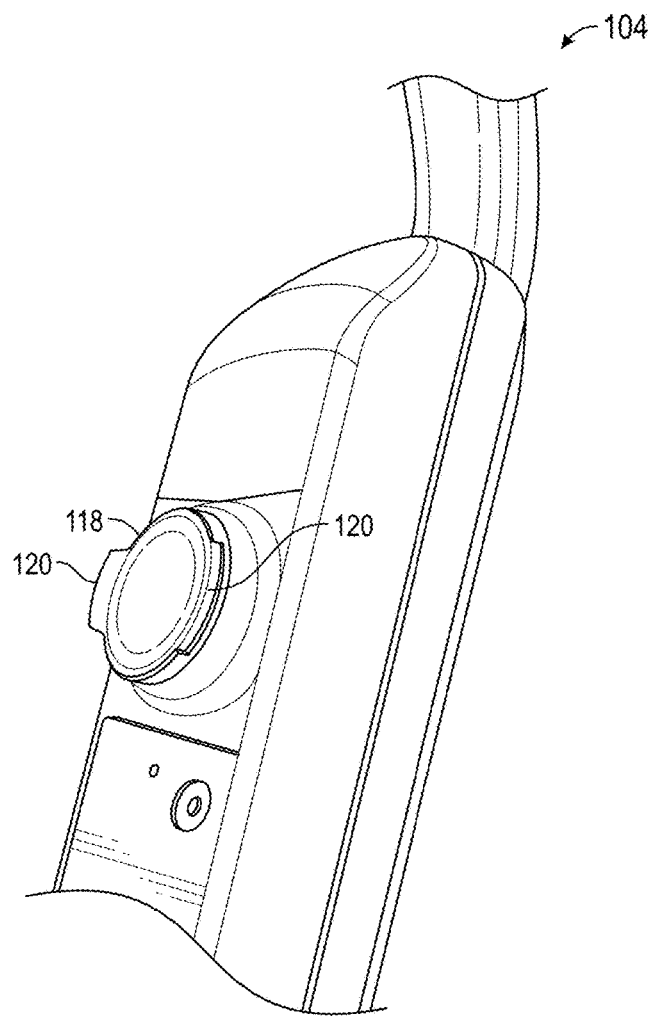
FIG. 13 is a partial perspective view of the head mounted display illustrated in FIG. 9.

FIGS. 9 through 17 illustrate an example head mounted display 104 in accordance with an embodiment of the system 100. As shown in FIG. 9, the head mounted display 104 includes an eyepiece 148 coupled to a body 152. The eyepiece 148 is coupled to the body 152 by an arm 150 that extends longitudinally between the eyepiece 148 and the body 152. The body 152 includes the mounting post 118, as described above. In some embodiments, the mounting post 118 may be keyed to mate with a recess of the receptacle 112 of the attachment device 102. For example, the mounting post 118 can include one or more outwardly extending flanges 120, as is best illustrated in FIGS. 9 and 13. The outwardly extending flanges 120 can engage the notches 116, allowing the mounting post 118 to be rotatably coupled with the mounting base 110 (e.g., as described with reference to FIGS. 10 and 11). The outwardly extending flanges 120 permit the mounting post 118 to engage with the mounting base 110 only when the head mounted display 104 is positioned at a selected angle (e.g., approximately ninety degrees (90°)) in relation to the attachment device 102.

FIG. 12 further illustrates the body 152 of the head mounted display 104. The body 152 may include various electrical/electronic components of the head mounted display 104 including but not necessarily limited to: processors, memory devices, display circuitry, one or more batteries, a global positioning system (GPS) receiver and/or other satellite navigation receivers, wireless radios (e.g., BLUETOOTH®, WI-FI®, ANT, cellular, etc.), power and other interface buttons (e.g., power button 158), a charging port (e.g., charging port 156), sensors, (e.g., light sensor 154, a thermal sensor, an optical sensor, etc.), one or more input devices (e.g., touchpad 162), and the like. In the illustrated embodiment, the power button 158 is shown as being located on an external surface of the body 152, and can provide power on/off function for the head mounted display 104. The charging port 156 is also located on the external surface, and can include one or more electrical contacts. The touchpad 162 is likewise located on the external surface and can be configured to receive input (e.g., data, commands, etc.) from a user. For example, a user may operate the head mounted display 104 by touching the touchpad 162 and/or by performing gestures (e.g., tapping, swiping, or otherwise gesturing with the hand/arm) on the touchpad 162. In some embodiments, the touchpad 162 may comprise a capacitive touch sensing area, a resistive touch sensing area, an infrared touch sensing area, combinations thereof, and the like.

Figure 14:
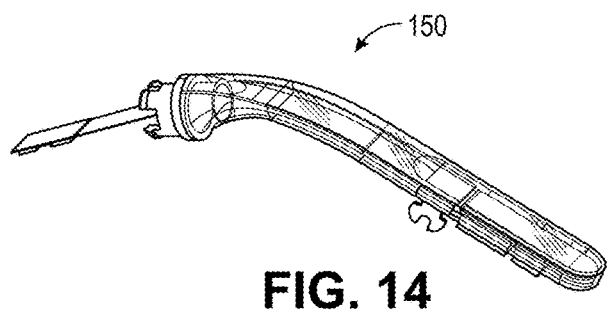
FIG. 14 is another partial perspective view of the head mounted display illustrated in FIG. 9.
Figure 15:
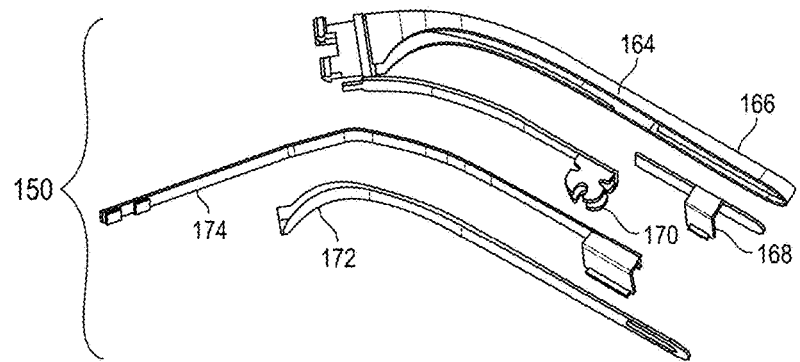
FIG. 15 is a partial exploded perspective view of the head mounted display illustrated in FIG. 9.
Figure 16:
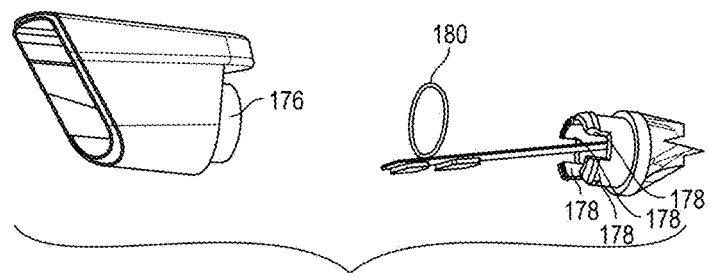
FIG. 16 is another partial exploded perspective view of the head mounted display illustrated in FIG. 9.
Figure 17:
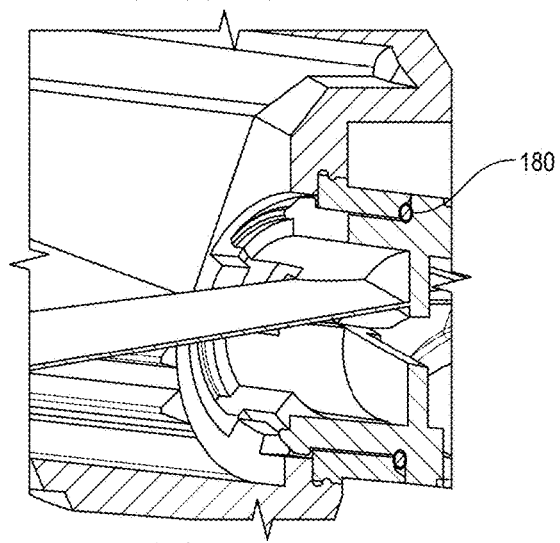
FIG. 17 is a partial cross-sectional perspective view of the head mounted display illustrated in FIG. 9.
Figure 18:
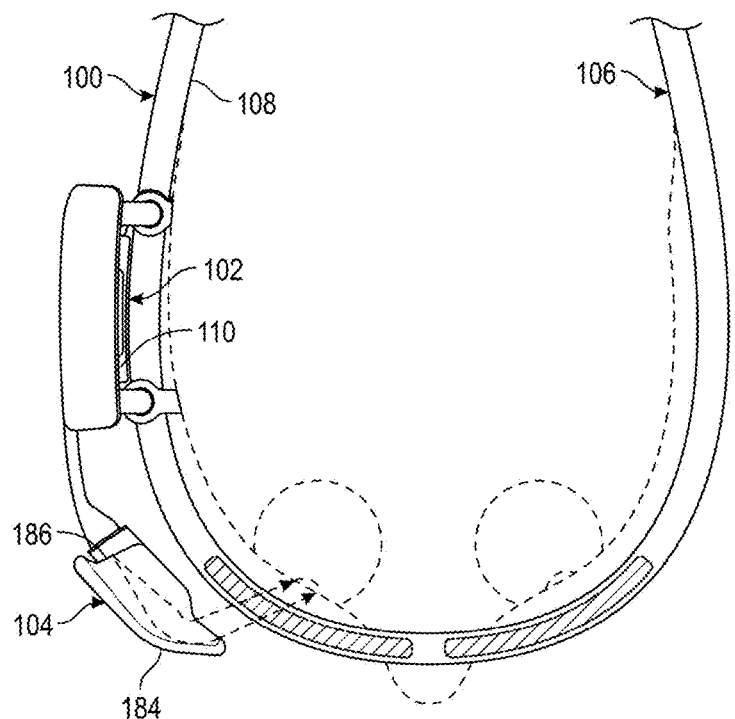
FIG. 18 is a top plan view illustrating an attachment device, such as the attachment device illustrated in FIG. 7, elastic bands, such as the elastic bands illustrated in FIG. 8, and a head mounted display, such as the head mounted display illustrated in FIG. 9, in accordance with embodiments of the present disclosure.

FIGS. 14 and 15 further illustrate the arm 150 of the head mounted display 104. The arm 150 can include one or more electrical wires and/or cables configured to transmit signals between the body 152 and the eyepiece 148. In embodiments, the arm 150 comprises a multi-layer construction. For example, in the embodiment shown, the arm 150 includes a housing portion 164, one or more flexible printed circuits (FCP) (e.g., touch FCP 168, electrical connection FCP 174, etc.), and a metal sheet 170. The electrical connection FCP 174 can enable communication between the body 152 and the eyepiece 148. The touch FCP 168 can provide functionality for one or more touch sensing areas (e.g., touch pads, touch areas, or other touch contacts) located on an external surface of the arm 150 and/or any other portion of the head mounted display 104 including, for example, the body 152. The touch sensing area can receive input from a user. For example, a user may operate the head mounted display 104 by touching the touch sensing area and/or by performing gestures (e.g., tapping, swiping, or otherwise gesturing on the hand/arm) on the touch sensitive area, as described above. The arm 150 can be enclosed with a second housing portion 172. One or more components of the arm 150 can be coupled by a fastener (e.g., O-ring 166, screw, pin, etc.). In embodiments, the housing portions 164, 172 can flexibly connect the body 152 to the eyepiece 148, allowing the user to bend the arm 150 to position the eyepiece 148 in a desired orientation.

Figure 19:
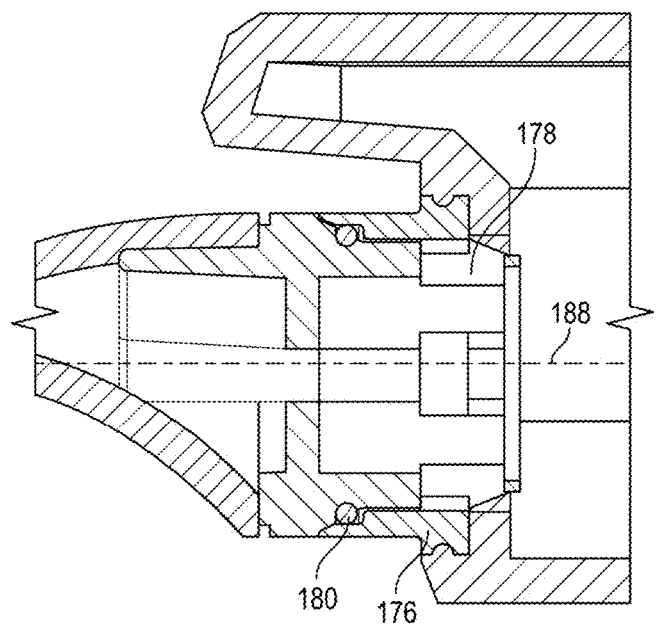
FIG. 19 is a partial cross-sectional side elevation view of the head mounted display illustrated in FIG. 9.

FIGS. 16 through 19 further illustrate the arm 150 and the eyepiece 148. In embodiments, the eyepiece 148 can be rotatably coupled to the arm 150 by one or more fasteners. In embodiments, the fastener may comprise a snap/metal ring assembly (e.g. as described with reference to FIGS. 16 and 17). For example, the eyepiece 148 can include a metal ring 176 and one or more O-rings 180 configured to interface with one or more snaps 178 located on the arm 150. The snap/metal ring assembly can provide waterproofing, and angle limitation into one hinge within a small (e.g., 10.0 mm) diameter. The snap/metal ring assembly can also provide rotation about an axis 188, as illustrated in FIG. 19. The rotation capability allows the user to adjust the angle of the eyepiece 148 in relation to a lens of the eyewear. However, the use of a snap/metal ring assembly is offered by way of example only and is not meant to be restrictive of the present disclosure. In other embodiments, other fasters can be used including, but not necessarily limited to snaps, screws, bolts, pins, and so forth).

The head mounted display 104 includes one or more one or more display devices. For example, in embodiments, the head mounted display 104 can include an optical engine 184 including a micro display 186 and/or other display devices for displaying information to a user, for example, as described with reference to FIG. 18. The display devices can be configured to overlay computer-generated graphics and/or data upon the user's view of the physical world. For example, the optical engine 184 can cause the micro display 186 to deliver data and/or image(s) to the user's eye. In embodiments, the micro display 186 can incorporate a variety of different technologies including, but not necessarily limited to: light projection, LCD (Liquid Crystal Diode), TFT (Thin Film Transistor), LED (Light Emitting Diode), OLED (Organic Light Emitting Diode), LEP (Light Emitting Polymer), PLED (Polymer Light Emitting Diode), electroluminescence, and so forth. In some embodiments, the eyewear can function as a component of the display. For example, a lens of the eyewear can act as a display surface, a combiner in a light projection system, and so forth. Alternatively or additionally, a light scanning technology can be employed to draw a raster display directly on the user's retina(s). In an embodiment, the display devices can be housed within the eyepiece 148. Alternatively or additionally, one or more display devices can be included in the arm 150 and/or the body 152. In embodiments, the user can direct the display to a desired angle and/or position by adjusting one or more components of the head mounted display 104 (e.g., bending the flexible arm 150, rotating the eyepiece 148, etc.), as described above. For example, the user can adjust the angle of the eyepiece 148 in relation to a lens of the eyewear to position the micro display 186 at a desired location (e.g., as described with reference to FIG. 19).

In embodiments, the system 100 can comprise, connect, and/or communicate with one or more mobile electronic devices that can furnish data and/or images to the display devices. The mobile electronic device may be configured in a variety of ways. For instance, a mobile electronic device may be configured for use during fitness and/or sporting activities and comprise a cycle computer, a cycle radar, a sport watch, a golf computer, a smart phone providing fitness or sporting applications (apps), a hand-held GPS device used for hiking, a heart rate monitor, a fitness tracker, a pedometer, and so forth. However, it is contemplated that the techniques may be implemented with any mobile electronic device that includes navigation functionality. Thus, the mobile electronic device may also be configured as a portable navigation device (PND), a mobile phone, a hand-held portable computer, a tablet computer, a personal digital assistant, a multimedia device, a media player, a game device, combinations thereof, and so forth. The system 100 can receive various content from the mobile electronic device. Content may represent a variety of different content, examples of which include, but are not limited to: map data, which may include route information; fitness data; web pages; services; music; photographs; video; email service; instant messaging; device drivers; real-time and/or historical weather data; instruction updates; and so forth.

In embodiments, the system 100 may be equipped with a vibration motor and/or audio capabilities. Alerts, notifications, or cues may be displayed in words (e.g., "incoming call") audible (e.g., saying "incoming call" or), haptic (e.g., vibrations, possibly at various intensities), or visual (e.g., illuminating all or a portion of the display in meaningful colors, flashing a light, etc.).

FIGS. 20 through 31D illustrate example displays that may be provided by the system 100 when various mode selections are made by the user in accordance with embodiments of the present disclosure. The user may activate or deactivate the display, change the mode, and/or change the display screen utilizing one or more of the touch sensing areas (e.g., touchpad 162) or other input devices (e.g., buttons, bezels, etc.) located on the head mounted display 104. It should be understood that the displays, functions, and operations specifically shown and described herein are examples of possible functionality that may be furnished by the system 100. Thus, the description of specific displays, modes of operations, and associated functionality herein should not be construed as limiting the functionality that may be provided by embodiments of the system 100.

Figure 20:
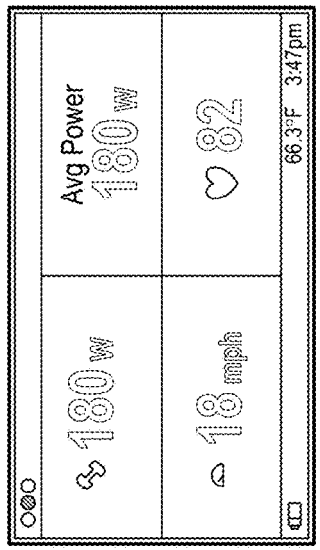
FIG. 20 is a screenshot illustrating a display for displaying on a head mounted display, such as the head mounted display illustrated in FIG. 9, in accordance with an embodiment of the present disclosure.
Figure 21:
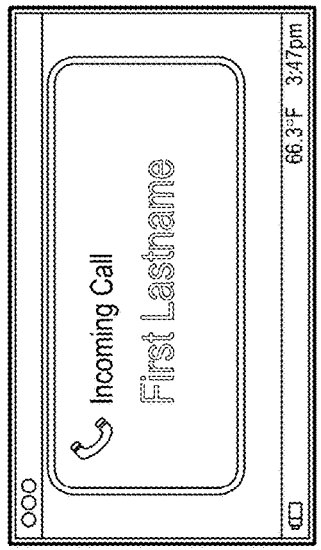
FIG. 21 is a screenshot illustrating another display for displaying on the head mounted display in accordance with an embodiment of the present disclosure.
Figure 22:
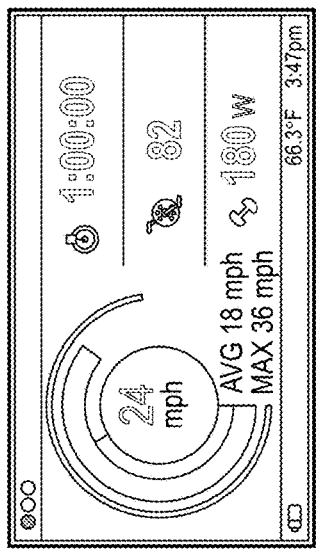
FIG. 22 is a screenshot illustrating a display for displaying on the head mounted display in accordance with an embodiment of the present disclosure.

FIGS. 20 through 22 illustrate example displays of data or indicia about a fitness activity (e.g., cycling, running, etc.). The display may include fitness data such as power/energy output (e.g., current power output, average power output, etc.), heart rate (e.g., current heart rate, average heart rate, maximum heart rate, etc.), speed (e.g., current speed, average speed, maximum speed, etc.), pace, cadence, workout time and/or length, and so forth. The data can also include environmental data such as date, time, temperature, etc. This data may be presented in a variety of formats such as text, images, or a combination thereof. For example, the data can be displayed as a combination of textual and graphical fields, as illustrated in FIG. 20. Alternatively, the data can be displayed as primarily textual or primarily graphical, as illustrated in FIGS. 21 and 22, respectively.

Figure 23:
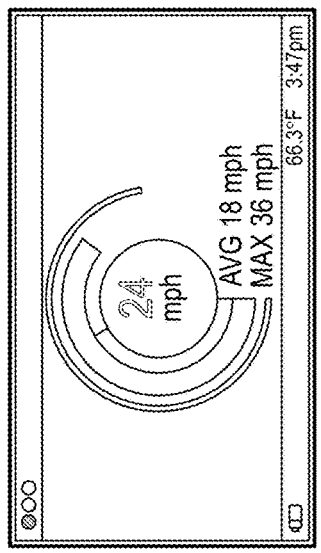
FIG. 23 is a screenshot illustrating another display for displaying on the head mounted display in accordance with an embodiment of the present disclosure.

In one or more embodiments, the display can include a notification for the user, as illustrated in FIG. 23. For example, the display can include a notification from an external mobile electronic device (e.g., call and/or text notifications from a smart phone). The display can also include a notification related to the head mounted display 104 (e.g., low battery notification, signal loss notification, etc.). Notifications may be displayed in text, displayed with images, haptic (e.g., vibration alerts), audible (e.g., beeps or spoken text), or communicated via another appropriate means to the user.

Figure 24:
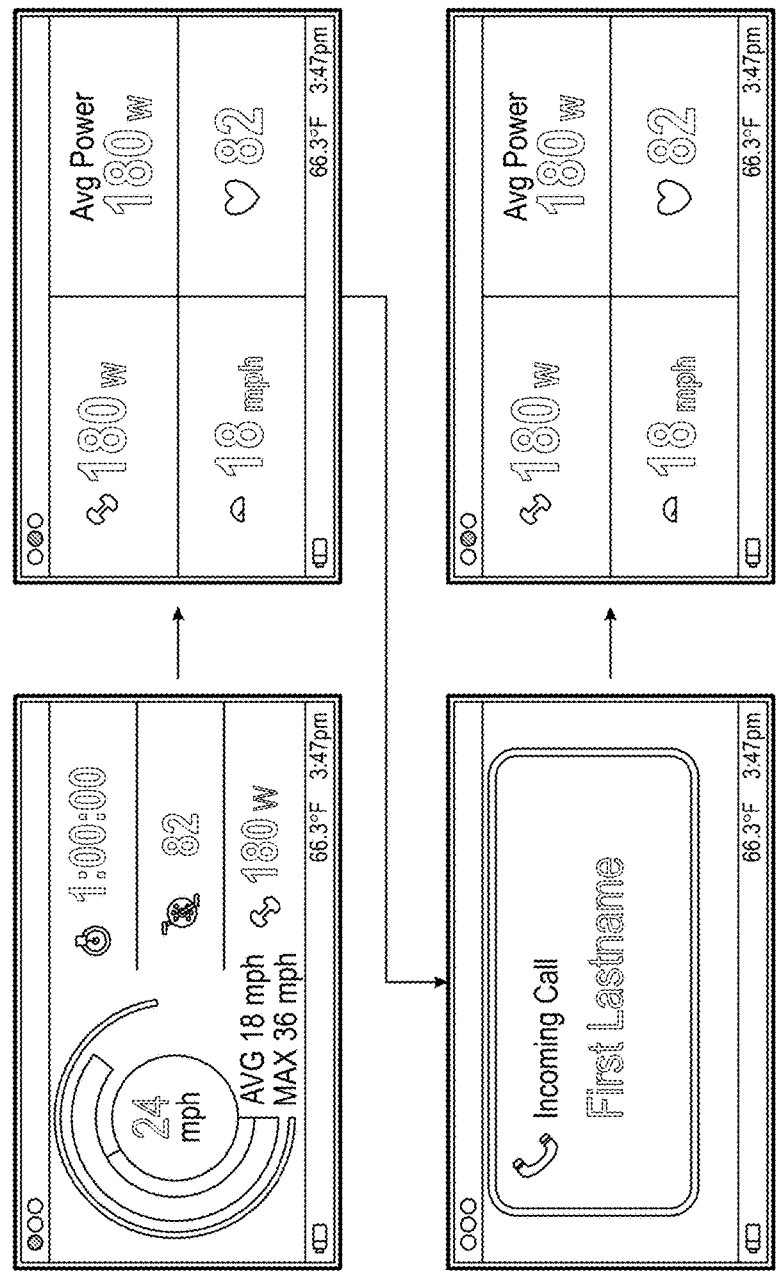
FIG. 24 is a schematic diagram of screenshots illustrating transitioning between displays on the head mounted display in accordance with an embodiment of the present disclosure.

FIG. 24 illustrates a schematic representation of transitioning between display screens. In embodiments, the user can activate or deactivate the display, change the display mode, change the display screen, and/or dismiss notifications utilizing one or more of the touch sensing areas (e.g., touchpad 162) or other input devices (e.g., buttons, bezels, etc.) located on the head mounted display 104. For example, the user can swipe the touchpad 162 to transition between display screens. In other embodiments, the user can transition between display screens using other input devices (e.g., buttons, bezels, etc.) located on the head mounted display 104.

Figure 26:
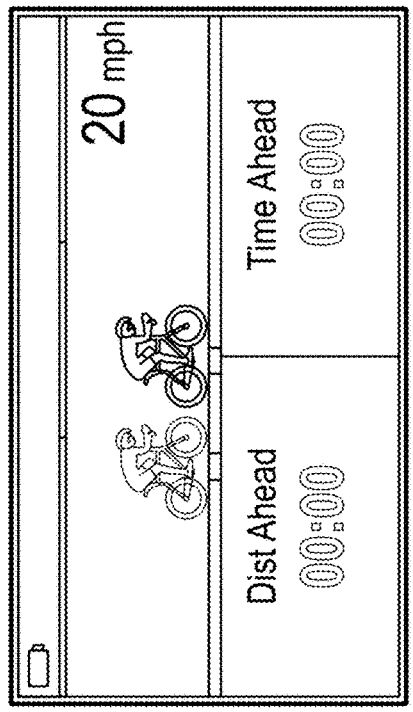
FIG. 26 is a screenshot illustrating another display for displaying on the head mounted display in accordance with an embodiment of the present disclosure.
Figure 25:
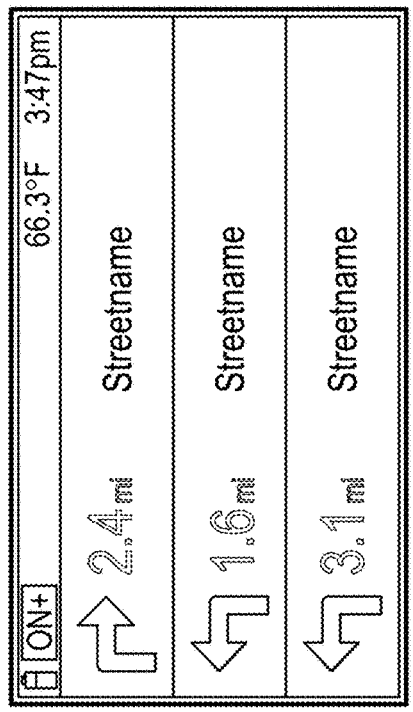
FIG. 25 is a screenshot illustrating another display for displaying on the head mounted display in accordance with an embodiment of the present disclosure.
Figure 27A:
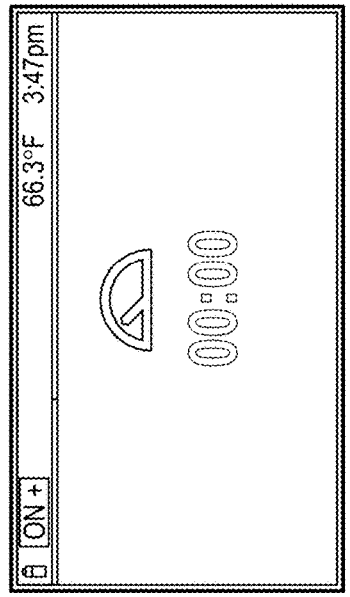
FIG. 27A is a screenshot illustrating another display for displaying on the head mounted display in accordance with an embodiment of the present disclosure.
Figure 27B:
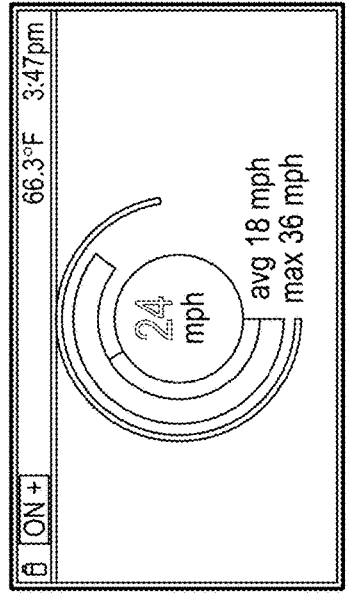
FIG. 27B is a screenshot illustrating another display for displaying on the head mounted display in accordance with an embodiment of the present disclosure.
Figure 27C:
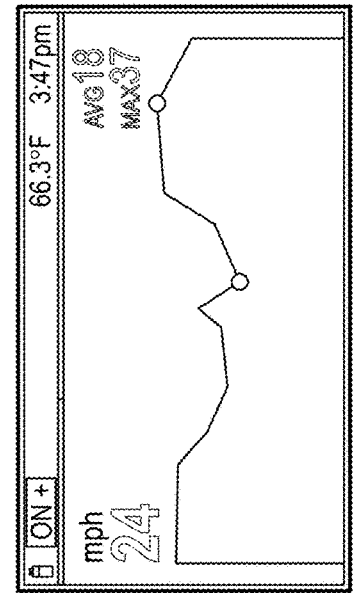
FIG. 27C is a screenshot illustrating another display for displaying on the head mounted display in accordance with an embodiment of the present disclosure.
Figure 27D:
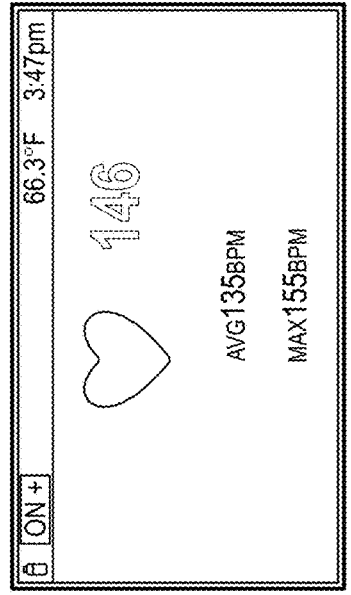
FIG. 27D is a screenshot illustrating another display for displaying on the head mounted display in accordance with an embodiment of the present disclosure.
Figure 28A:
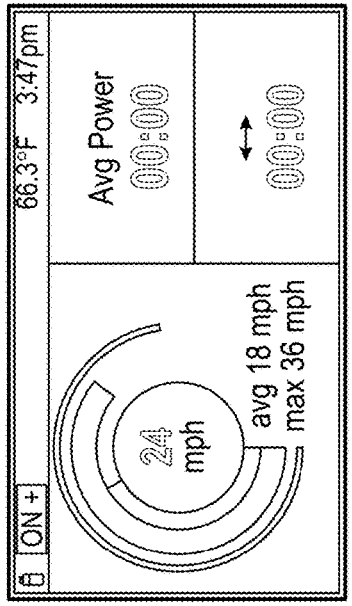
FIG. 28A is a screenshot illustrating a display divided into display sections for displaying on the head mounted display in accordance with an embodiment of the present disclosure.
Figure 28B:
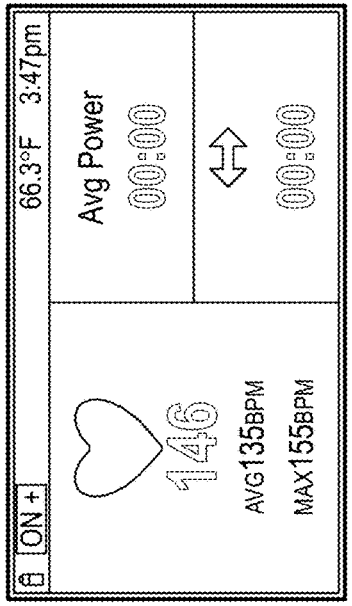
FIG. 28B is a screenshot illustrating another display divided into sections for displaying on the head mounted display in accordance with an embodiment of the present disclosure.
Figure 28C:
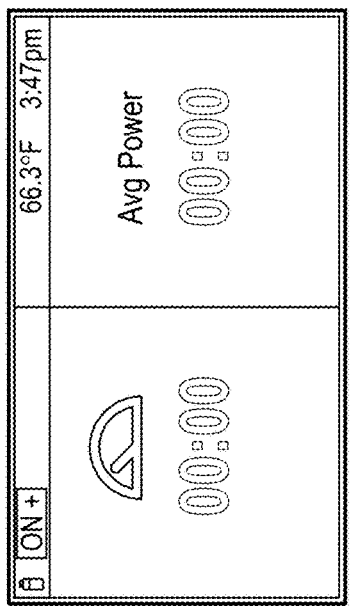
FIG. 28C is a screenshot illustrating another display divided into sections for displaying on the head mounted display in accordance with an embodiment of the present disclosure.
Figure 28D:
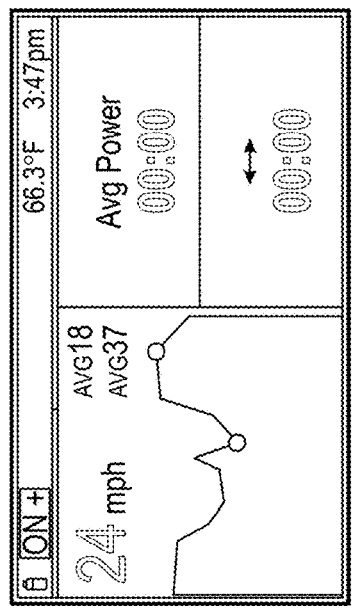
FIG. 28D is a screenshot illustrating another display divided into sections for displaying on the head mounted display in accordance with an embodiment of the present disclosure.

FIGS. 25 and 26 illustrate example displays furnishing navigation instructions. For example, the display can include turn-by-turn instructions for a pre-calculated route (e.g., to an input destination or point of interest), as illustrated in FIG. 25. The display can also include traveling distances and times, as illustrated in FIG. 26. For example, the display can include distance to and/or time to a pre-calculated destination (e.g., an input destination or a point of interest). In embodiments, the display can include other navigation information such as a displayed map, current position of a user on a displayed math, and so forth.

Figure 29A:
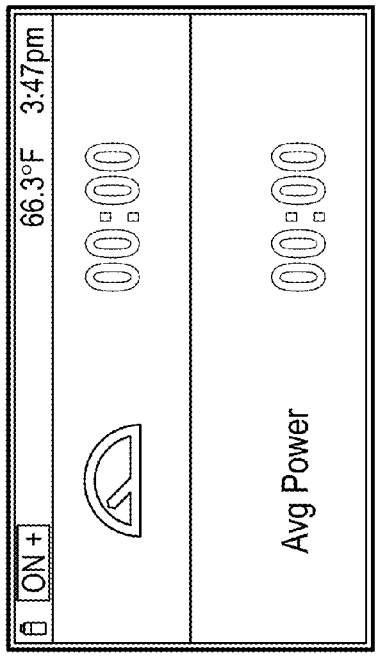
FIG. 29A is a screenshot illustrating another display divided into sections for displaying on the head mounted display in accordance with an embodiment of the present disclosure.
Figure 29B:
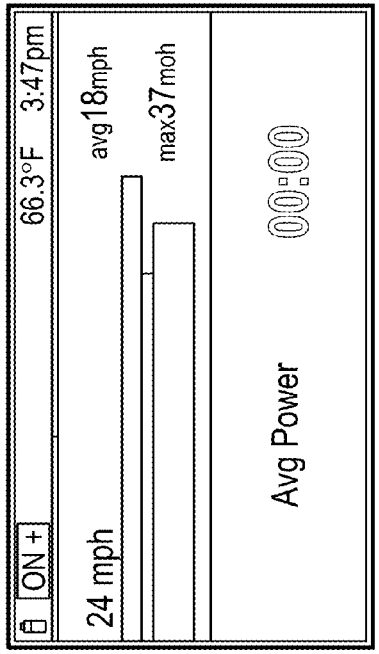
FIG. 29B is a screenshot illustrating another display divided into sections for displaying on the head mounted display in accordance with an embodiment of the present disclosure.
Figure 29C:
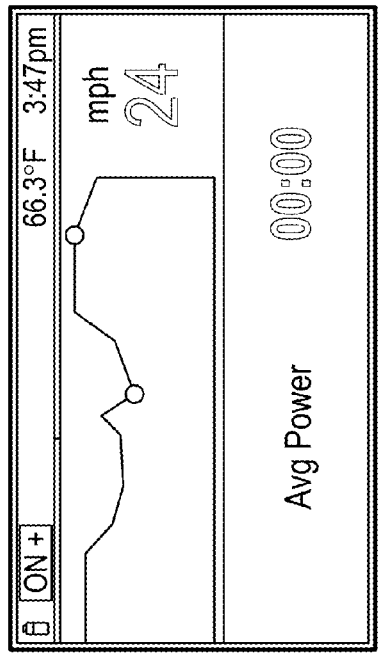
FIG. 29C is a screenshot illustrating another display divided into sections for displaying on the head mounted display in accordance with an embodiment of the present disclosure.
Figure 29D:
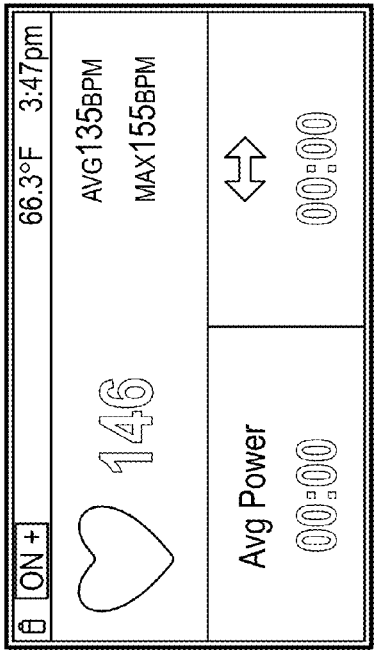
FIG. 29D is a screenshot illustrating another display divided into sections for displaying on the head mounted display in accordance with an embodiment of the present disclosure.

FIGS. 27A through 29D illustrate displays including data oriented in a variety of ways (e.g., full screen, partial screen, etc.). For example, data can be displayed over the entire display screen, as illustrated in FIGS. 27A through 27D. Alternatively, the display can be divided along one or more horizontal and/or vertical axes into a plurality of display sections that can each provide different data content to the user. For example, the display can be divided along one vertical axis into two display sections, as illustrated in FIG. 28A. One or both of the display sections can be further divided along a horizontal axis, as illustrated in FIGS. 28B through 28D. In another implementation, the display can be divided along a vertical axis into two display sections, as illustrated in FIGS. 29A through 29C. One or both of the display sections can be further divided along a vertical axis, as illustrated in FIG. 29D.

Figure 30:
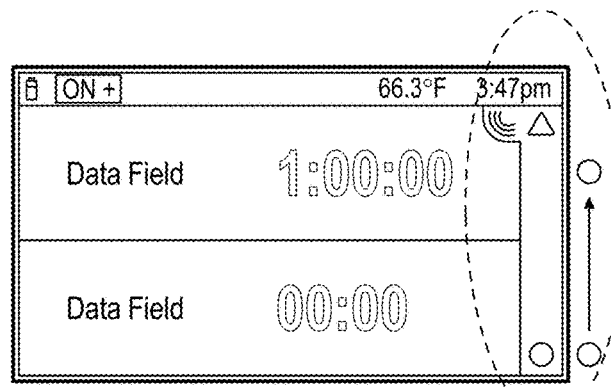
FIG. 30 is a screenshot illustrating a display including a target tracking feature for displaying on the head mounted display in accordance with an embodiment of the present disclosure.
Figures 31A, 31B, 31C, 31D:
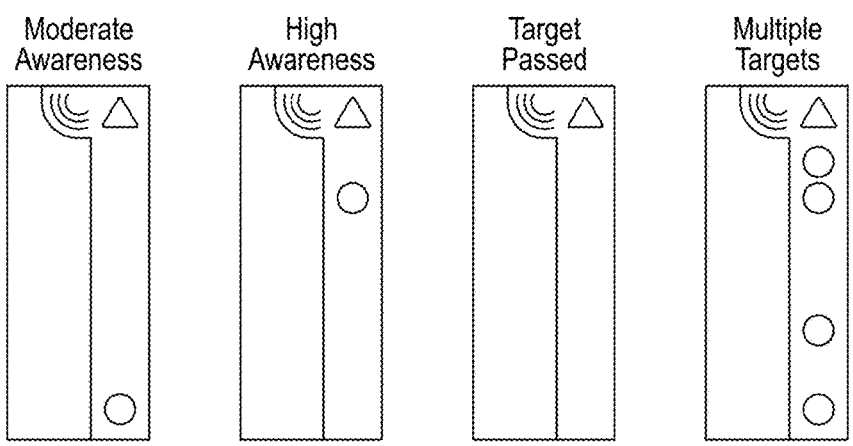
FIG. 31A is a screenshot illustrating an example awareness level for a target tracking feature, such as the target tracking feature illustrated in FIG. 30, for displaying on the head mounted display in accordance with an embodiment of the present disclosure.
FIG. 31B is a screenshot illustrating another example awareness level for a target tracking feature, such as the target tracking feature illustrated in FIG. 30, for displaying on the head mounted display in accordance with an embodiment of the present disclosure.
FIG. 31C is a screenshot illustrating another example awareness level for a target tracking feature, such as the target tracking feature illustrated in FIG. 30, for displaying on the head mounted display in accordance with an embodiment of the present disclosure.
FIG. 31D is a screenshot illustrating another example awareness level for a target tracking feature, such as the target tracking feature illustrated in FIG. 30, for displaying on the head mounted display in accordance with an embodiment of the present disclosure.

FIG. 30 illustrates an example display including a target tracking feature. The target tracking feature can include data about an incoming target, such as a rear-approaching vehicle. When an incoming target is sensed, the screen may display awareness level information (see FIGS. 31A through 31D) using dots, color illumination, or any other visual indicator. In embodiments, the target tracking data can be obtained from one or more sensors (e.g., radar sensor) coupled to the system 100, and/or mobile electronic devices such as a cycle computer (e.g., Garmin Edge), a cycle radar (e.g., Garmin Varia), and so forth. Information may be visually represented here, such as target status or target distance. FIGS. 31A through 31D illustrate example "awareness levels" for the target tracking feature. FIG. 31A illustrates a moderate awareness level, displaying the target as a dot along the target tracking feature, indicating that there is a rear-approaching vehicle (the target). FIG. 31B illustrates a high awareness level, displaying the target as a dot along the target tracking feature, indicating that there is a rear-approaching vehicle very near the user. FIG. 31C illustrates that the target has passed, displaying no target dot. FIG. 31D illustrates the presence of multiple targets, displaying multiple targets as dots along the target tracking feature, indicating that there are numerous rear-approaching vehicles at varying distances from the user. In other embodiments, the awareness levels may further include color illumination indicators along a portion of the display (e.g., green illumination for low awareness level, orange illumination for moderate awareness, red illumination for high awareness level and/or multiple targets, etc.).

Figure 32:
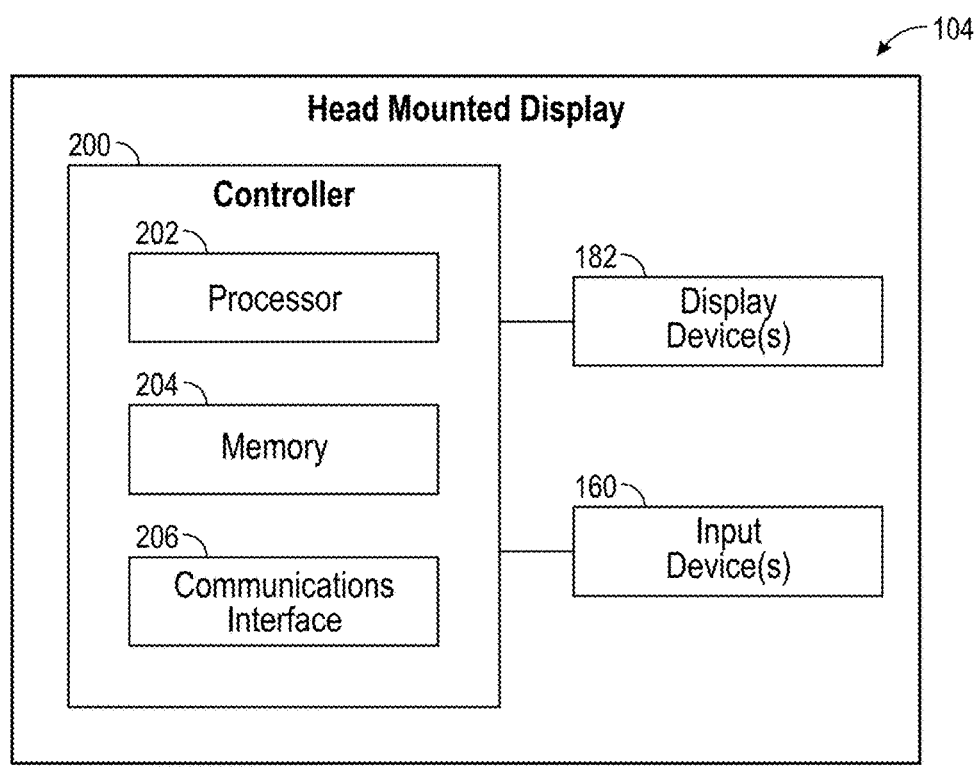
FIG. 32 is a block diagram illustrating a system for a head mounted display in accordance with embodiments of the present disclosure.

Referring now to FIG. 32, a system 100, including some or all of its components, can operate under computer control. For example, a processor can be included with or in a system 100 to control the components and functions of systems 100 described herein using software, firmware, hardware (e.g., fixed logic circuitry), manual processing, or a combination thereof. The terms "controller," "functionality," "service," and "logic" as used herein generally represent software, firmware, hardware, or a combination of software, firmware, or hardware in conjunction with controlling the systems 100. In the case of a software implementation, the module, functionality, or logic represents program code that performs specified tasks when executed on a processor (e.g., central processing unit (CPU) or CPUs). The program code can be stored in one or more computer-readable memory devices (e.g., internal memory and/or one or more tangible media), and so on. The structures, functions, approaches, and techniques described herein can be implemented on a variety of commercial computing platforms having a variety of processors.

The head mounted display 104 can be coupled with a controller 200 for controlling the head mounted display 104. The controller 200 can include a processor 202, a memory 204, and a communications interface 206. The processor 202 provides processing functionality for the controller 200 and can include any number of processors, micro-controllers, or other processing systems, and resident or external memory for storing data and other information accessed or generated by the controller 200. The processor 202 can execute one or more software programs that implement techniques described herein. The processor 202 is not limited by the materials from which it is formed or the processing mechanisms employed therein and, as such, can be implemented via semiconductor(s) and/or transistors (e.g., using electronic integrated circuit (IC) components), and so forth.

The memory 204 is an example of tangible, computer-readable storage medium that provides storage functionality to store various data associated with operation of the controller 200, such as software programs and/or code segments, or other data to instruct the processor 202, and possibly other components of the controller 200, to perform the functionality described herein. Thus, the memory 204 can store data, such as a program of instructions for operating the system 100 (including its components), and so forth. It should be noted that while a single memory 204 is described, a wide variety of types and combinations of memory (e.g., tangible, non-transitory memory) can be employed. The memory 204 can be integral with the processor 202, can comprise stand-alone memory, or can be a combination of both.

The memory 204 can include, but is not necessarily limited to: removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth. In embodiments, the head mounted display 104 and/or the memory 204 can include removable integrated circuit card (ICC) memory, such as memory provided by a subscriber identity module (SIM) card, a universal subscriber identity module (USIM) card, a universal integrated circuit card (UICC), and so on.

The communications interface 206 is operatively configured to communicate with components of the system 100. For example, the communications interface 206 can be configured to transmit data for storage in the system 100, retrieve data from storage in the system 100, and so forth. The communications interface 206 is also communicatively coupled with the processor 202 to facilitate data transfer between components of the system 100 and the processor 202 (e.g., for communicating inputs to the processor 202 received from a device communicatively coupled with the controller 200). It should be noted that while the communications interface 206 is described as a component of a controller 200, one or more components of the communications interface 206 can be implemented as external components communicatively coupled to the system 100 via a wired and/or wireless connection. The system 100 can also comprise and/or connect to one or more input/output (I/O) devices 160 (e.g., via the communications interface 206), including, but not necessarily limited to: a display, a mouse, a touchpad, a keyboard, and so on. The I/O devices 160 may include one or more audio I/O devices, such as a microphone, speakers, and so on.

The system 100 can further include one or more display devices 182 (e.g., optical engine 184 including micro display 186 and/or other display devices). The display devices 182 can incorporate a variety of different technologies including, but not necessarily limited to: light projection, LCD (Liquid Crystal Diode), TFT (Thin Film Transistor), LED (Light Emitting Diode), OLED (Organic Light Emitting Diode), LEP (Light Emitting Polymer), PLED (Polymer Light Emitting Diode), electroluminescence, and so forth, configured to display text and/or graphical information such as a graphical user interface.

The communications interface 206 and/or the processor 202 can be configured to communicate with a variety of different networks, including, but not necessarily limited to: a wide-area cellular telephone network, such as a 3G cellular network, a 4G cellular network, or a global system for mobile communications (GSM) network; a wireless computer communications network, such as a Wi-Fi network (e.g., a wireless local area network (WLAN) operated using IEEE 802.11 network standards); an internet; the Internet; a wide area network (WAN); a local area network (LAN); a personal area network (PAN) (e.g., a wireless personal area network (WPAN) operated using IEEE 802.15 network standards); a public telephone network; an extranet; an intranet; and so on. However, this list is provided by way of example only and is not meant to limit the present disclosure. Further, the communications interface 206 can be configured to communicate with a single network or multiple networks across different access points.

Generally, any of the functions described herein can be implemented using hardware (e.g., fixed logic circuitry such as integrated circuits), software, firmware, manual processing, or a combination thereof. Thus, the blocks discussed in the above disclosure generally represent hardware (e.g., fixed logic circuitry such as integrated circuits), software, firmware, or a combination thereof. In the instance of a hardware configuration, the various blocks discussed in the above disclosure may be implemented as integrated circuits along with other functionality. Such integrated circuits may include all of the functions of a given block, system, or circuit, or a portion of the functions of the block, system, or circuit. Further, elements of the blocks, systems, or circuits may be implemented across multiple integrated circuits. Such integrated circuits may comprise various integrated circuits, including, but not necessarily limited to: a monolithic integrated circuit, a flip chip integrated circuit, a multichip module integrated circuit, and/or a mixed signal integrated circuit. In the instance of a software implementation, the various blocks discussed in the above disclosure represent executable instructions (e.g., program code) that perform specified tasks when executed on a processor. These executable instructions can be stored in one or more tangible computer readable media. In some such instances, the entire system, block, or circuit may be implemented using its software or firmware equivalent. In other instances, one part of a given system, block, or circuit may be implemented in software or firmware, while other parts are implemented in hardware.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. An attachment system for attaching a portable display to a headpiece having at least one longitudinal frame member, the attachment system comprising:
   a portable display comprising a head mounted display (HMD), wherein the HMD is configured to wirelessly receive information from a cycle radar and visually indicate the proximity to the system of one or more radar targets;
   a mounting base configured to mount to the longitudinal frame member of the headpiece;
   a mounting protrusion disposed on one of the mounting base or the portable display;
   a receptacle disposed on the other of the mounting base or the portable display for receiving the mounting protrusion; and
   a first hook and an opposing second hook connected to the mounting base, the first hook and the second hook configured to receive opposing ends of an elastic band when the elastic band is connected between the first hook and the second hook around the longitudinal frame member;
   wherein the receptacle comprises a quarter-turn mount receptacle and the mounting protrusion comprises a quarter-turn mounting protrusion to be received by the quarter-turn mount receptacle.

2. The attachment system as recited in claim 1, wherein the mounting protrusion is disposed on the portable display and the receptacle is disposed on the mounting base.

3. The attachment system as recited in claim 1, further comprising a third hook and an opposing fourth hook connected to the mounting base, the third hook and the fourth hook configured to receive opposing ends of a second elastic band when the second elastic band is connected between the third hook and the fourth hook around the longitudinal frame member.

4. The attachment system as recited in claim 3, wherein the third hook and the fourth hook are connected to the mounting base on opposing sides of the receptacle or the mounting protrusion from the first hook and the second hook.

5. The attachment system as recited in claim 1, wherein the HMD is configured to indicate the proximity of the one or more radar targets by utilizing one or more dots to indicate the location of the one or more radar targets.

6. The attachment system as recited in claim 1, wherein the HMD is configured to indicate an awareness level for the one or more radar targets.

7. An attachment system for attaching a portable display to a headpiece having at least one longitudinal frame member, the attachment system comprising:
   a portable display comprising a head mounted display (HMD), wherein the HMD is configured to wirelessly receive information from a cycle radar and visually indicate the proximity to the system of one or more radar targets;
   a mounting base configured to mount to the longitudinal frame member of the headpiece;
   a mounting protrusion disposed on one of the mounting base or the portable display;
   a receptacle disposed on the other of the mounting base or the portable display for receiving the mounting protrusion;
   a first hook and an opposing second hook connected to the mounting base, the first hook and the second hook configured to receive opposing ends of an elastic band when the elastic band is connected between the first hook and the second hook around the longitudinal frame member; and
   a friction pad disposed on the mounting base or the mounting protrusion for resisting rotational movement of the mounting protrusion.

8. The attachment system as recited in claim 7, wherein the mounting protrusion is disposed on the portable display and the receptacle is disposed on the mounting base.

9. The attachment system as recited in claim 7, wherein the receptacle comprises a quarter-turn mount receptacle and the mounting protrusion comprises a quarter-turn mounting protrusion to be received by the quarter-turn mount receptacle.

10. The attachment system as recited in claim 7, further comprising a third hook and an opposing fourth hook connected to the mounting base, the third hook and the fourth hook configured to receive opposing ends of a second elastic band when the second elastic band is connected between the third hook and the fourth hook around the longitudinal frame member.

11. The attachment system as recited in claim 10, wherein the third hook and the fourth hook are connected to the mounting base on opposing sides of the receptacle or the mounting protrusion from the first hook and the second hook.

12. The attachment system as recited in claim 7, wherein the HMD is configured to indicate the proximity of the one or more radar targets by utilizing one or more dots to indicate the location of the one or more radar targets.

13. The attachment system as recited in claim 7, wherein the HMD is configured to indicate an awareness level for the one or more radar targets.

* * * * *